United States Patent [19]

Roussy et al.

[11] 4,259,561

[45] Mar. 31, 1981

[54] MICROWAVE APPLICATOR

[75] Inventors: Georges Roussy, Laxou; André-Jean Berteaud, Versailles; Jean-Marie Thiebaut, Heillecourt, all of France

[73] Assignee: Agence Nationale de Valorisation de la Recherche (ANVAR), France

[21] Appl. No.: 901,830

[22] Filed: May 1, 1978

[30] Foreign Application Priority Data

May 6, 1977 [FR] France .................................. 77 13903

[51] Int. Cl.³ .............................................. H05B 6/70
[52] U.S. Cl. ......................... 219/10.55 A; 219/10.55 F; 333/233
[58] Field of Search .................. 219/10.55 A, 10.55 R, 219/10.55 F; 333/83 R, 98 M, 95, 76

[56] References Cited

U.S. PATENT DOCUMENTS

| | | | |
|---|---|---|---|
| 2,412,446 | 12/1946 | De Walt | 333/83 R |
| 2,747,137 | 5/1956 | Tonks | 333/83 R |
| 3,151,230 | 9/1964 | Britton | 333/83 R |
| 3,242,304 | 3/1966 | Hickman | 219/10.55 A |
| 3,315,187 | 4/1967 | Nakahara et al. | 333/95 |
| 3,543,199 | 11/1970 | Quine et al. | 333/98 M |
| 3,754,111 | 8/1973 | Jurgensen | 219/10.55 A |
| 3,765,985 | 10/1973 | Siard et al. | 219/10.55 A |
| 3,784,777 | 1/1974 | Soulier | 219/10.55 A |
| 3,920,945 | 11/1975 | Smith et al. | 219/10.55 R |

OTHER PUBLICATIONS

Tischer, 'The Groove Guide' 1/21/63, IEEE Transactions on Microwave, vol. MTT-11, No. 5, pp. 291-296.
Ruddy, 'Experiment Results in Groove Guide', IEEE Transactions on Microwave, vol. MTT-13, pp. 880-881, (1965).

Primary Examiner—B. A. Reynolds
Assistant Examiner—Philip H. Leung
Attorney, Agent, or Firm—Thomas J. Greer, Jr.

[57] ABSTRACT

The invention provides a microwave feeder or applicator, that is to say a resonant chamber for coupling to a source of microwaves, arranged for the microwave treatment of a sample of material, comprising two main conductive walls extending parallel to a common axial direction and each having two projections and a central part joining the two projections, the projections of the two walls facing one another in pairs whereas the central parts of the two walls likewise face one another and define a region in which there is a local increase in the distance between the two main walls; a first conductive end wall forming a short-circuit and extending in a plane forming a cross-section of the main walls; a second conductive end wall forming a second short-circuit extending in a plane forming a cross-section of the main walls, and a coupling means for supplying microwave energy to the feeder, the dimensions of the cavity formed by the main end walls being arranged so that the cavity resonates almost exclusively in the $TE_{11}$ mode, where the electric field is oriented along the cross-section of the main walls.

27 Claims, 12 Drawing Figures

FIG_2

FIG_3

MICROWAVE APPLICATOR

BACKGROUND OF THE INVENTION

The invention relates to a microwave feeder or applicator, i.e., a conductive chamber for coupling to an electromagnetic microwave generator, arranged to receive a sample of material which is consequently processed by a microwave electromagnetic field.

It can be shown, from Maxwell's equations, that any cavity filled with a homogeneous dielectric has stationary or resonating stages ("natural modes") for a discrete set of frequencies of microwaves called natural resonance frequencies. It is thus possible, in the case of substantially cylindrical cavities, to calculate the electric field and the magnetic field in the cavity at various natural anodes.

The difficulty is that since the microwave feeder contains a sample, its behaviour differs from that of a cavity filled with a homogeneous dielectric—i.e., the feeder contains a first dielectric space (that occupied by the sample) and a second dielectric space, i.e., the air surrounding the sample. The dielectric characteristics of the sample are invariably quite different from those of air, and the introduction of the sample modifies the resonance state which can be calculated when the feeder is filled with air only.

In practice, if the volume of the sample is very small compared with that of the cavity, e.g., in the case when the dielectric constants of materials are measured the small modification produced by introducing the sample is calculated by a method of successive approximations, which gives satisfactory results.

However, the size of the sample is inevitably important in the case of microwave treatment, as opposed to measurement. Consequently the method of successive approximations is unsuitable for microwave feeders.

In the simple, conventional example of microwave kitchen ovens, where the dimensions of the food to be cooked may vary and the volume of the oven is large, the number of possible natural resonance modes is quite high. In preference to optimising the energy output of the various modes in dependence on the various sizes of sample, an average is obtained of all the possible modes, using a mode mixer. Usually the mixer comprises a fan having metal blades which rotate and thus deform the volume offered to the microwaves. The resulting microwave feeder offers a large volume but is not resonant in operation, and thus cannot subject the processed product to a powerful electric field.

It is also known to construct resonating microwave feeders in the form of a cylindrical cavity having a circular cross-section, for treating a cylindrical sample disposed coaxially to the cavity, or a parallelepipedal cavity through which the cylindrical sample extends from one side to the other. However, these feeders are inevitably small if they are to be resonant in operation, and therefore cannot be used to treat large samples in a powerful microwave electric field.

The invention has an object to provide a substantially cylindrical resonating microwave feeder suitable for elongate transversely-disposed samples.

SUMMARY OF THE INVENTION

Accordingly the invention provides a microwave feeder comprising two main conductive walls extending parallel to a common axial direction and each having two projections and a central part joining the two projections, the projections of the two walls facing one another in pairs whereas the central parts of the two walls likewise face one another and define a region in which there is a local increase in the distance between the two main walls; a first conductive end wall forming a short-circuit and extending in a plane forming a cross-section of the main walls; a second conductive end wall forming a second short-circuit extending in a plane forming a cross-section of the main walls, and a coupling means for supplying microwave energy to the feeder, the dimensions of the cavity formed by the main and end walls being arranged so that the cavity resonates almost exclusively in the $TE_{11}$ mode, where the electric field is oriented along the cross-section of the main walls.

The feeder preserves its resonances when its dimensions are proportionally increased for treating samples having a large cross-section. Secondly, the cross-section of the electric field applied to the sample is constant along its length and can be completely determined by experiment, inter alia by temperature measurement in the case of heat-treatment. The electric field cross-section can be adjusted as required by varying the proportions of the feeder.

The feeder is also tunable without the tuning means producing large variations in the electric field near the sample. This is very important, since in numerous cases the electric properties of the sample material vary during microwave treatment e.g., as a result of an increase in temperature. In such cases there is likewise a variation in the cavity resonance frequency, and as it is usually impossible to adjust the frequency of the microwave source, the frequency adjustment is made on the cavity. In the cavity according to the invention, this tuning operation makes only a slight difference to the electric field at the sample, which is an important advantage.

Geometrically, the feeder of the invention is defined as a generally cylindrical surface enclosing an open cross-section and having a contour comprising two separate parts. Each part of the contour comprises two straight-line portions or two groups of straight-line portions defining the projections and connected by a curved or broken line (called the channel) and having a concavity facing the other part of the contour. The two concave channels face one another, and they are the components which define the local increase in distance between the main walls. Finally, the surface of the feeder is closed by two transverse end walls extending along the cross-section.

The cylindrical surface enclosing the thus-defined cross-section is open at its two sides. However, the distance between the parallel straight-line portions is appreciably less than the length of these portions. Consequently the resulting apertures at the sides are small compared with the entire cylindrical surface and they are used for admitting the sample to be treated.

Advantageously, the cylindrical surface is closed by two side walls extending in the axial direction and joining the free ends of the main walls between the two end walls. At least one such side wall has an orifice for the admittance of a sample to be treated.

According to another aspect of the invention, the two main walls are symmetrical with respect to an axial or mode plane parallel to their axial direction, and to the general direction of their major transverse dimension. In the mode plane, the electric field is parallel to the general direction of the major direction of the main walls in the cross-section thereof.

The sample for processing is placed between the two main walls of the feeder at an intermediate position between the two end walls. Preferably the sample is in elongate form and its major dimension is in a direction substantially perpendicular to the axial direction of the main walls, i.e., the axis of the cylindrical surface. The sample is disposed substantially equidistant from the two main walls.

Preferably the second conducting end wall is movable in the axial direction of the main walls, so that the feeder can be tuned to a given frequency depending on the microwave processing conditions.

Resonanace substantially in the $TE_{11}$ mode is obtained if the dimensions of the region of local increase in distance between the main walls, are chosen, with respect to the normal distance between the main walls, to give preference only to the $TE_{11}$ and $TM_{11}$ modes, and the distance between the conductive end walls is made substantially equal to an integral multiple of the half wavelength associated with the $TE_{11}$ mode, so that the feeder resonates only at the $TE_{11}$ mode.

With regard to the coupling means, the orifice or orifices constituting it can be on various walls of the feeder, so as to supply it with a microwave electromagnetic field distribution corresponding to the desired mode in the feeder near the orifice or orifices.

A number of couplings have been constructed in this manner. In one case, the orifice was formed in the middle of one of the end walls of the feeder. In that case, it is advantageous to use a number of small-area coupling orifices instead of a single large-area orifice. In another method of coupling, the orifice is formed in one of the concave channels in the feeder.

In both cases, variable coupling can be obtained by forming the orifice on a side wall of the wave guide supplying microwave energy. The wave guide is provided with an end piston near the coupling orifice. The coupling between the wave guide and feeder can be varied in very simple manner by moving the piston.

In addition, variable coupling can be obtained by moving an auxiliary plate, partially reflecting microwaves, near the coupling orifice.

Preferably a coupling transition is provided for ensuring a progressive transition from the electromagnetic field distribution associated with the propagation mode in a standard rectangular guide to the desired mode distribution in the feeder near the coupling orifice. The desired mode in the feeder is the mode corresponding to the fundamental resonance $TE_{11}$.

BRIEF DESCRIPTION OF THE DRAWINGS

Other features and advantages of the invention will be clear from the following detailed description of some exemplary embodiments of the invention with reference to the accompanying non-limitative drawings in which:

FIG. 1 is a perspective view diagrammatically illustrating a microwave feeder with a sample to be treated, the feeder having its front end wall omitted, and its rear end wall shown after being dismantled.

FIGS. 5A and 5B are two views in section illustrating a first arrangement for coupling a feeder to a wave guide, whereas

DESCRIPTION OF PREFERRED EMBODIMENTS

Figures 1, 4:
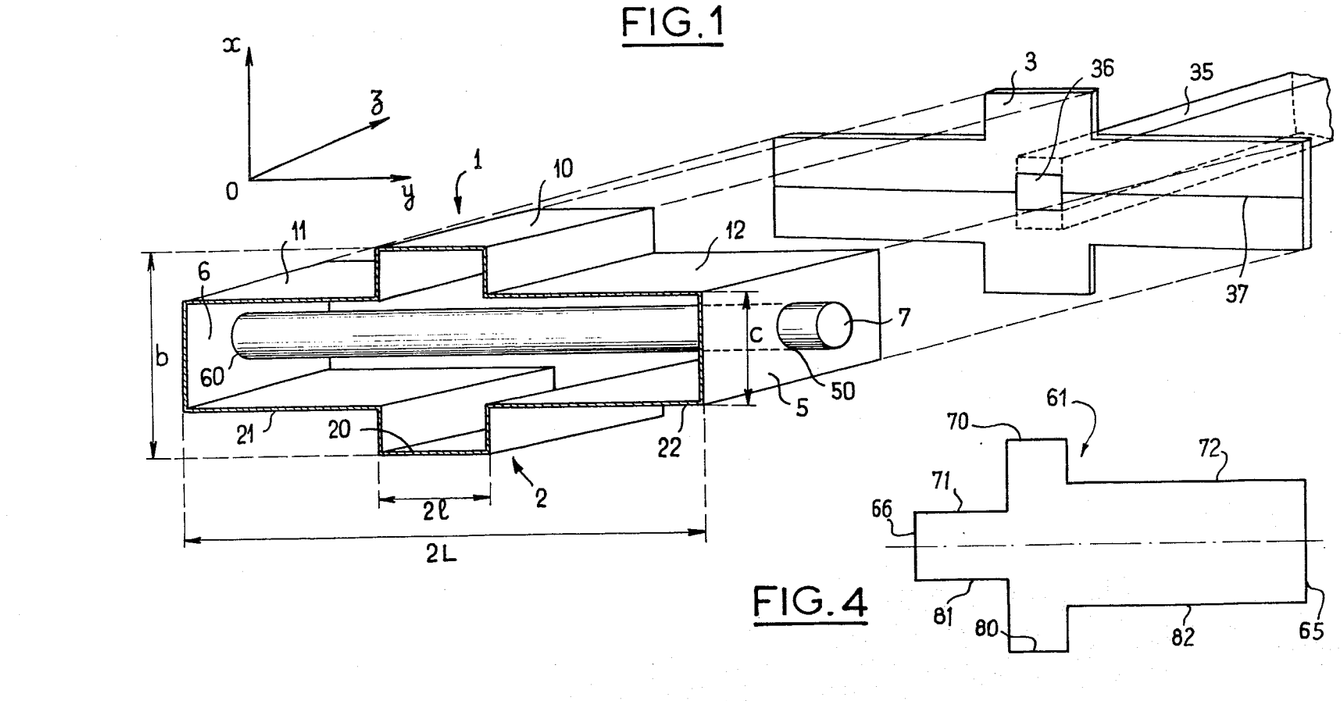
Figure 1A:
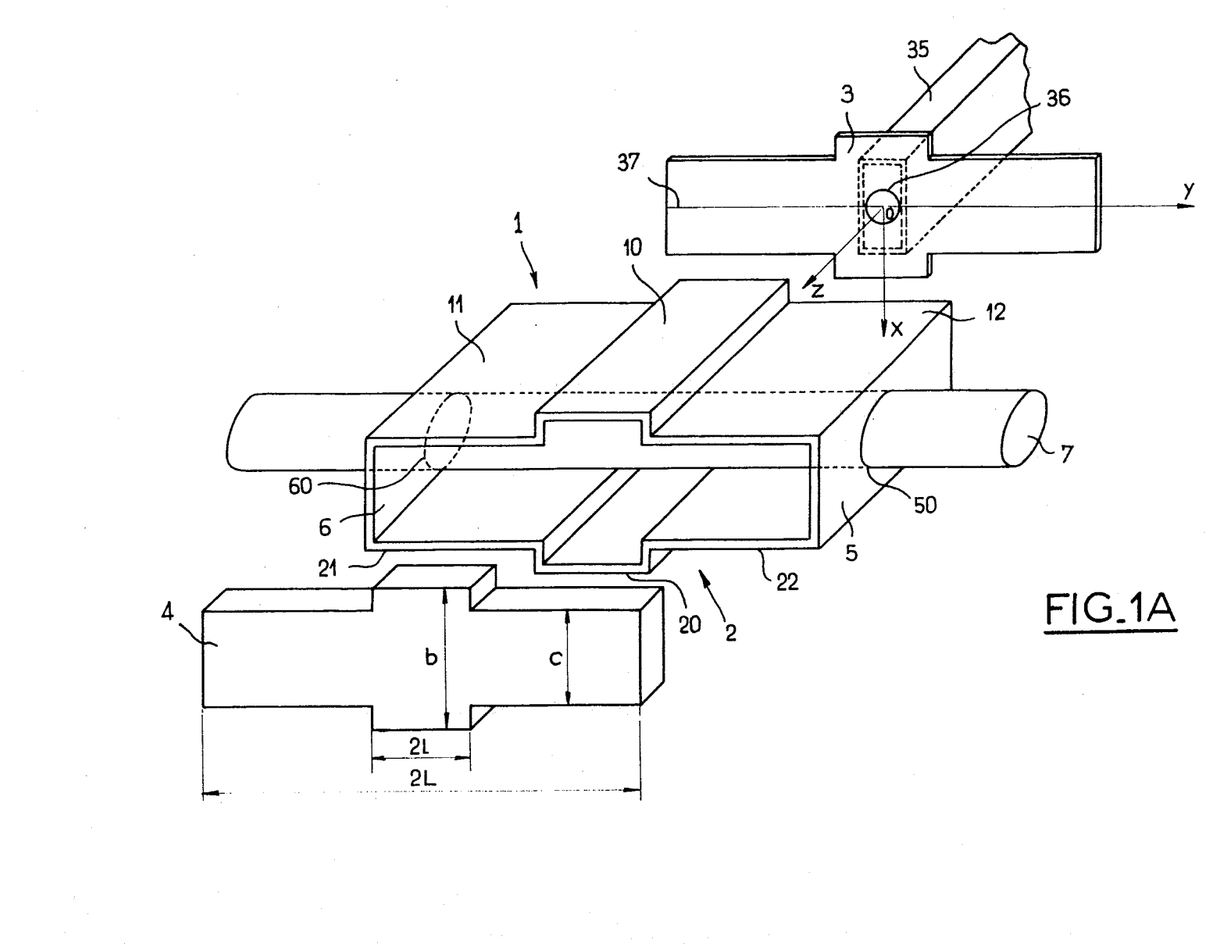
FIG. 1A is a view similar to FIG. 1 but also showing the front end wall, whereas the rear end wall has a slightly different-shaped coupling orifice.

FIGS. 1 and 1A show a feeder having two main conductive facing walls denoted by the general references 1 and 2, and conductive end walls 3 and 4. The two walls are parallel along their axial direction in the co-ordinate system shown for reference beside the FIG. Oz. They are substantially parallel along the major transverse dimension of their cross-section (the Oy direction). However, there is a local increase in the distance between them near the centre of the cross-section, the distance being measured along the Ox direction. Thus, the main wall 1 has lateral projections 11 and 12, whereas main wall 2 has lateral projections 21, 22 corresponding respectively to projections 11, 12 of wall 1. The four projections 11, 12, 21, 22 are parallel to one another and form pairs at a constant distance from one another. Near the centre of the feeder, the wall 1 has a substantially U-shaped channel 10 and the wall 2 has a likewise substantially U-shaped channel 20. At this point, the distance between the main walls is larger, since it is measured between the bottoms of the two channels 10 and 20.

The two main walls are thus symmetrical with respect to an axial or mode plane. The mode plane is parallel to the axial direction Oz and to the general direction Oy of the major transverse dimension of the main walls.

Each wall 10, 20 is in turn symmetrical with respect to a second axial plane, perpendicular to the mode plane and extending through the Oz and Ox directions. As a whole, therefore, the feeder is symmetrical with respect to an axis in the Oz direction passing through its centre. In this embodiment, let 2l denote the common length of channels 10 and 20, b the maximum distance between the main walls taken between the bottoms of the channels, and c the distance between the respective projections from the main walls. All these distances are measured between the inner surfaces of the walls. These distances can then be used to express the condition for the feeder to resonate almost exclusively in the $TE_{11}$ mode as discussed above. This condition is expressed in two stages.

Only the $TE_{11}$ and $TM_{11}$ resonance modes are privileged when the following two inequalities are substantially satisfied:

$$b/3 \leq c < b$$

-continued $$\frac{1}{c^2} - \frac{1}{b^2} \leq \frac{1}{4L^2}$$

Next, in order to give preference to the $TE_{11}$ mode only, the distance between the two conductive end walls 3, 4 is made substantially equal to an integral multiple of the half wave-length associated with the $TE_{11}$ mode. In the described embodiment, this half wavelength can be calculated mathematically.

The base of the feeder, at the rear of FIG. 1, is closed by the conductive end wall 3 which forms a short-circuit extending along a cross-section of walls 1 and 2. The outer shape of end wall 3 thus reproduces the inner shape of the cross-section defined by walls 1 and 2. Advantageously, the interior of wall 3 is formed with a groove 37 extending in the mode plane.

The front part of the cavity is closed by the second conductive end wall 4 forming a second short-circuit which, like the first end wall 3, extends along a cross-section of the main walls. The second end wall 4 is movable as a piston (FIGS. 1A and 2) and can slide between the two main walls of the feeder. Advantageously, the surface of wall 4 facing the interior of the feeder is likewise formed with a groove disposed in the same manner as groove 37 on wall 3.

Advantageously the grooves are filled with a material which absorbs microwaves. This not only prevents interfering resonance modes being formed by the end walls but also at least partly absorbs any other modes produced in the cavity.

In order to obtain an efficient microwave short-circuit, the movable end wall or piston 4 must be in electric contact with the rest of the feeder around its entire periphery. This condition can be satisfied by designing the periphery of piston 4 as a "λ/4 trap" i.e. so that the periphery overlies the rest of the feeder over a thickness at least equal to a quarter of the wavelength associated with the $TE_{11}$ mode. This can be obtained inter alia by suitably choosing the thickness of piston 4 or by widening its periphery with an axial conductive border, e.g. in the form of a comb.

In the first embodiment of the invention (FIGS. 1 and 1A) the end wall 3 is secured to a supply in the form of a standard wave guide 35 having a rectangular cross-section. The wall also has an orifice 36 for inductively coupling the supply wave guide 35 to the cavity inside the main walls 1 and 2. Waveguide 35 is chosen to supply the cavity with an electric field along the Oy direction, and the coupling orifice 36 is adapted for "inductively" coupling wave guide 35 to the feeder cavity. To this end, orifice 36 extends over the entire width of wave guide 35 but only a part of its height. Consequently wave guide 35 and orifice 36 are symmetrical with respect to the aforementioned mode plane Ozy.

The previously-described elements are sufficient to construct a resonating microwave applicator. However, in the preferred embodiment of the invention, the cavity defined by the feeder is closed by side walls 5 and 6. Walls 5 and 6 extend in the axial direction Oz and join the free ends of the projections from the main walls. As before, walls 5 and 6 are perpendicular to the general direction Oy of the major transverse dimension of the main walls. Walls 5 and 6 have similar orifices 50 and 60 for the admittance of a cylindrical sample 7 to be processed by the feeder.

Orifices 50 and 60 or any other suitable means are used to define a sample-holding position formed between walls 1 and 2 and substantially equidistant therefrom, i.e. symmetrically with respect to the aforementioned mode plane. The feeder is particularly adapted for processing an elongate sample having a major dimension extending perpendicular to the axial direction of the two main walls and parallel to the general direction Oy of the major transverse dimension of the main wall. Consequently, the major dimension of sample 7 extends in the direction of the electric field in the mode plane of the cavity. As previously stated, resonance almost exclusively in the $TE_{11}$ mode is obtained by defining the distance between the end walls 3 and 4 so that it is equal to an integral multiple of the half wavelength associated with the $TE_{11}$ mode. Since the cavity contains a number of half wave-lengths it is clear to the skilled addresses that it contains nodes and antinodes of the electric field. Preferably, of course, sample 7 is disposed substantially at an antinode of the electric field.

Figure 2:
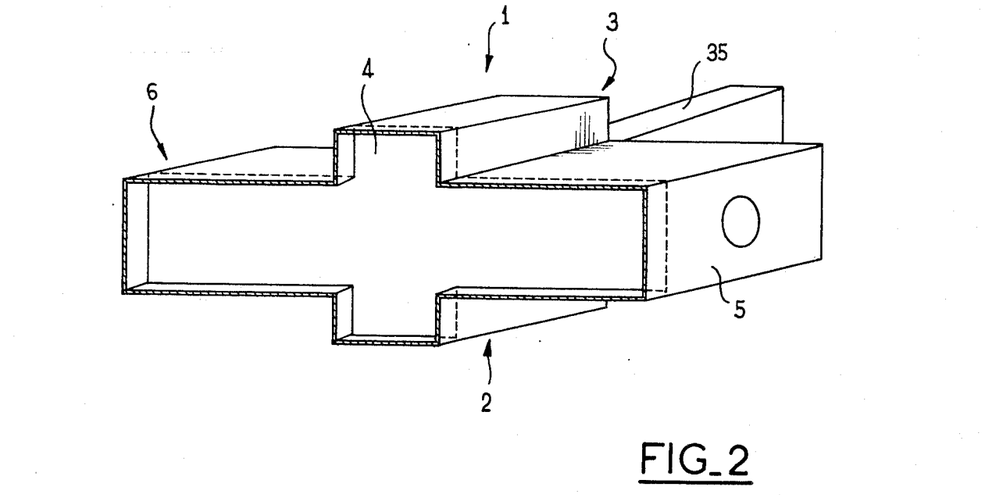
FIG. 2 is a perspective view illustrating a microwave feeder including a front end wall but without the sample to be treated.
Figure 3:
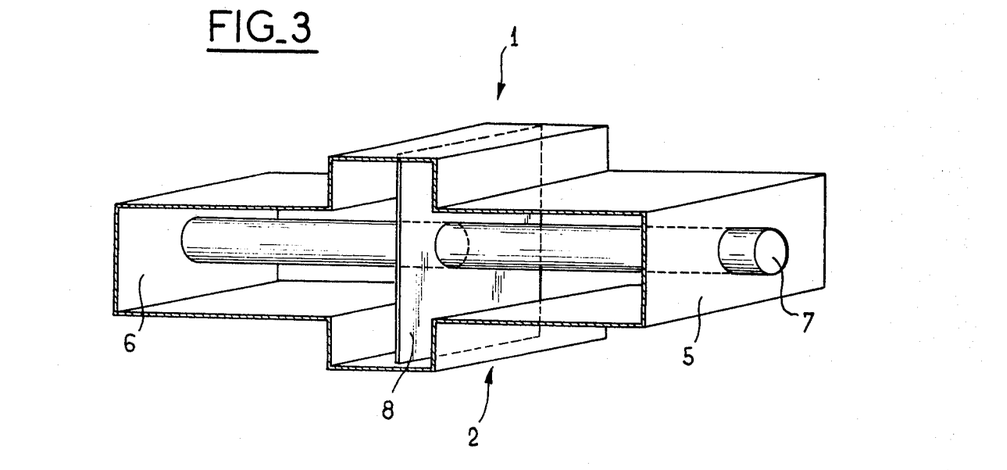
FIG. 3 is a perspective view illustrating a microwave feeder without a front or rear end wall but with a central plate holding the sample to be treated, FIG. 4 diagrammatically illustrates a microwave feeder having a modified cross-section.

FIG. 3 illustrates a variant of the feeder in FIGS. 1, 1A and 2. In FIG. 3, the end walls 3, 4 have been omitted to simplify the drawing. As before, the drawing shows the main walls 1 and 2, the side walls 5 and 6 and the cylindrical sample 7. A metal plate 8 is disposed inside the feeder along the vertical plane of symmetry xOz. It has been found that this plate, when placed in this manner along the plane of vertical symmetry, produces substantially no change in the electric field distribution inside the cavity. It is also used to hold the sample 7 at its centre, where the electric field is strongest. This is very important for microwave heating, since the sample may tend to creep in the heated region. Wall 8 substantially divides the cavity into halves. However it does not extend to the front end of the cavity, i.e. wall 4 can still move. In a simple variant, wall 8 can of course be extended up to the end of the feeder, but in the case the end wall 4 is made up of two parts, one on each side of wall 8. Alternatively, a wall 8 may be disposed to extend only in the neighbourhood of the sample, and used exclusively as a sample-holder if necessary.

We shall now give examples of heat-treatment with a microwave feeder according to the above embodiment of the invention.

EXAMPLE 1

The dimensions of the cavity are denoted by the same symbols as before, plus the dimension 2L, i.e. the major transverse dimension of the cavity between its side walls 5 and 6, and its length Z, measured along the Oz axis. A cavity was constructed having the following dimensions, measured as before between the inner surfaces of the walls: b=132 mm; c=88 mm; 2l=100 mm; 2L=700 mm; Z=310 mm.

The coupling orifice 36 was 38 mm wide (the Ox direction), this width being defined by an adjustable iris diaphragm.

The resonance of the cavity was first tested in the absence of the sample at a frequency of 2.45 GHz. The resulting Q factor was approx. 6 000. The coupling factor β was 0.9.

The coupling factor β defines the quality of coupling of the cavity to its supply wave guide. When β is equal to unity, the cavity absorbs all the microwave energy supplied to it. The difference between the coupling factor and unity indicates the proportion of energy reflected on its return by the supply wave guide. It is considered that a coupling factor 0.9 is a good result.

The Q factor is even more important since it defines the quality of resonance inside the cavity. Resonance occurs as soon as the Q factor is equal to 2 or more. The microwave processing in the cavity improves the higher Q factor. A value of 6 000 indicates that the cavity has excellent resonance.

Finally, microwave treatment was applied to a non-sintered alumina sample 15 mm in diameter and 80 cm long. The dimensions of the cavity were the same as before except that its length Z was adjusted by varying the position of the end wall 4. At the start, the length Z had been adjusted to cause the cavity to resonate in the presence of the sample. Subsequently, adjustments were made in order to maintain the resonance with temperature. During the adjustment, the length Z was approx. 280 mm.

At a microwave energy power of 1.8 kW, the sample was heated to 1500° C. over a length of 3 cm at the centre of the cavity.

EXAMPLE 2

In Example 2, the samples were of "Teflon" (Registered Trade Mark). In order to limit the consumption of material, the frequency used was 26.6 GHz (wave length in vacuo 11.2 mm). The results are comparable with those in Example 1, provided the dimensions are scaled in the same ratio as the wavelengths, which is the reciprocal of the frequency wavelengths.

The dimensions of the feeder used in Example 2 were the following:
b = 17 mm
c = 11 mm
2l = 8 mm
2L = 60 mm
Z = 42.7 mm Without a sample and when the coupling factor $\beta$ was very near unity, the cavity had a Q factor of 1240, which was considered a very good result.

The "propagation length" of the $TE_{11}$ mode in the feeder can be calculated; it is 12.2 mm. The length L of the feeder is 42.7 mm, i.e. 3.5 times the propagation length. Since there are two antinodes and two nodes along the propagation length, the $TE_{11}$ mode is seventh-order (i.e. 7 antinodes and 6 nodes). In a vacuum, the cavity resonates equally well with or without the side walls 5 and 6 in FIG. 1.

Next, teflon rods (electric characteristics $\epsilon = 2.3$; $\epsilon'' = 10^{-4}$, diameters 11 mm and 5 mm) were introduced in succession. As is known, the apparent diameter of these rods for microwaves is $\sqrt{\epsilon'} \cdot d$, giving substantially one and a half wave lengths at 26.6 GHz for the 11 mm diameter rods.

A feeder containing these rods and open at the sides, i.e. without the lateral walls 5 and 6, has a very low Q factor; the Q factor which could not be measured being estimated as being less than 5.

The resonance in general was measured in the case of a feeder according to the first embodiment and closed at the sides. The results are illustrated in Tables I and II hereinafter, in which z denotes the distance of the rod from the waveguide, Z is the total length of the cavity and Q is the measured Q factor. In all cases the rod was exactly perpendicular to the Oz axis and equidistant from the main walls of the feeder.

TABLE I

| Rod 11 mm in diameter | | | |
| --- | --- | --- | --- |
| z | 19.5 | 13.5 | 11.5 |

TABLE I-continued

| Rod 11 mm in diameter | | | |
| --- | --- | --- | --- |
| Z | 31.4 | 31.4 | 31.4 |
| Q | 1200 | 430 | 830 |

As can be seen, a resonance occurs independently of the position of the rod. On the other hand the Q factor and consequently the quality of resonance depend on the position. Consequently experiments are necessary to determine that position of the sample which gives the desired Q factor and a suitable distribution of the electromagnetic field.

TABLE II

| Rod 5 mm in diameter | | |
| --- | --- | --- |
| z | 24 | 21 |
| Z | 41.6 | No clear resonance peak |
| Q | 740 | less than 10 |

All these results show that the perturbation produced by the rod in the cavity can be controlled, thus controlling the efficiency of the feeder. The Q factor obtained with the sample is almost as high as for the feeder in vacuo. This means that the additional losses through diffraction, which are a risk in microwave feeders in general, have been reduced and controlled in the feeder according to the above embodiments of the invention. In this connection, it is important for the sample to be treated to be exactly perpendicular to the Oz axis.

The preceding examples also show that the feeder operates considerably more efficiently when it has side walls and they are not perforated except at the places necessary for the sample to pass through. In some applications, however, these apertures can be made fairly large, e.g. in the case of a wide, flat sample or for a conveyor belt conveying material to be processed through the feeder.

With regard to shape, the sample is most advantageously elongate or cylindrical having a circular or polygonal cross-section preferably substantially regular. However, Table I shows that when the dimensions of the sample cross-section are approximately equal to the wave length, the shape of the cross-section becomes of secondary importance. It is then possible to process bulk material (e.g. cement) on a conveyor belt.

Experience has shown that the decrease of the electric field in the projections is related to the spacing c between them—i.e. the decrease is inversely proportional to the spacing. In addition, the length 21 of the channel defines the width of the intense electric-field region. Consequently, by varying these two parameters, the cross-section of the electric field to which the sample is subjected can be adjusted. The adjustment can be experimentally improved by heating a sample in the feeder and simultaneously measuring its temperature, e.g. by optical pyrometry.

In numerous industrial applications, e.g. heat-treatment, it is desirable for the rise and decrease in temperature to occur at different speeds or along different gradients. In that case, the distances between the feeder projections are advantageously made different. This is illustrated in FIG. 4 which shows components corresponding to those in FIG. 1 but with their reference numbers increased by 60. As can be seen, there are different distances between projections 71, 81 and projections 72, 82. There are no changes in the main features of the invention, i.e. the central increase in distance between the ends 70, 80 of the facing U-shaped channels. This variant is asymmetrical with respect to the xOz plane but symmetrical with respect to the mode plane yOz.

It has already been pointed out that the resonating feeder according to the invention has a long dimension. The cross-sectional distribution of electric field is largely along the Oy direction and is adjustable in the manner described. This width of the region of high electric field, over the cross-section is quite unusual in prior-art feeders. As previously stated, the feeder walls must be conductive. Of course, it is sufficient for the internal surface of the walls to be conductive to a thickness corresponding to the "skin effect" which is well known in the case of microwave, whereas the rest of the structure may be non-metallic and provide the mechanical strength of the assembly. The words "conductive wall" therefore refer in this case to the internal wall, which has a thickness at least corresponding to the skin effect.

The cross-section of the feeder according to the invention is similar to that of a known waveguide comprising channels (F. J. TISCHER, THE Groove Guide, a low-loss waveguide for millimeter waves, I.E.E.E. Trans. M.T.T. II (1963) pp. 291–295; T. NAKAHARA, N. KURAUCHI, Transmission mode in Groove Guide I. Inst. Elec. Com. Japan 47 (1964), pp. 1029–1036), but its application is quite different. However, the channel waveguides are not closed at the side, and this results in a TEM mode, similar to microwave propagation between two flat walls.

In the case of the feeder according to the invention, the side walls are preferably closed, thus preventing the propagation of the TEM mode.

As an additional result, the electric field tends to increase in the projections because of the conductive side walls and this is considered an advantage, since it results in an increase in the amplitude of the electric field through the sample.

Conductive side walls are necessary for samples having a size comparable with the wave length, as shown by example 2. On the other hand, in the case of samples having a cross-section which is small compared with the wave length, the side walls of the feeder do not have to be closed by a conductive material, since it can be assumed that the perturbation caused by the sample is small.

Of course, the invention is not limited to the embodiment of the invention described above, wherein the main walls have a channel in which the sides are perpendicular to the bottom. The invention extends to all kinds of main walls having a local increase in their spacing near the centre of the cross-section which they define.

The invention also extends to any kind of supply coupling. In order to supply microwave energy to the feeder, it is sufficient to construct an orifice (or non-conductive region) in a wall thereof at which the electromagnetic field is significant at resonance, and to supply an energizing electromagnetic field through the orifice via a waveguide, the field having a component in the same direction as the field in the feeder near the orifice.

The previously-described method of coupling has given good results. It has been observed, however, that the coupling tends to produce interfering modes of resonance in the feeder. This does not matter in a vacuum, but the presence of the sample for treatment makes it difficult to distinguish the interfering modes from the fundamental. An incorrect choice of mode will result in a decrease in the feeder efficiency.

We shall now describe some preferred methods of coupling which greatly reduce the interfering resonance modes by providing a gradual transition between the wave guide and the feeder. The transition is chosen so that the electromagnetic field distribution is practically the same (in the absence of an orifice) on both sides of the wall in which the coupling orifice is formed.

Advantageously a number of small coupling apertures are provided in preference to a single large aperture, so as not excessively to modify the field distribution as a result of perforating the wall.

Figure 5A:
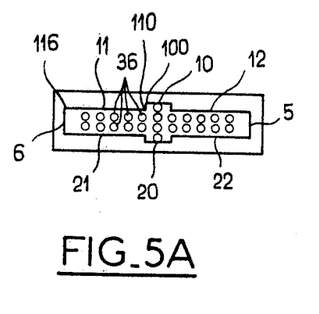
Figure 5B:
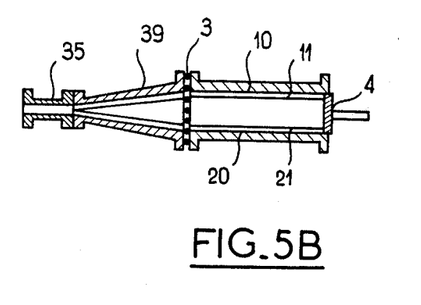

FIGS. 5A and 5B represent a first preferred coupling. The conductive end wall 3 of the feeder is formed with a number of small orifices 36 which are distributed in a substantially regular manner (at least statistically) except possibly at the ends of the projections near walls 5 and 6, where the field is weak (FIG. 5A). The wave guide 35 is not coupled directly to the feeder but via a transition 39 which extends gradually from the rectangular cross-section of the guide to the feeder cross-section (FIG. 5B).

Figure 6:
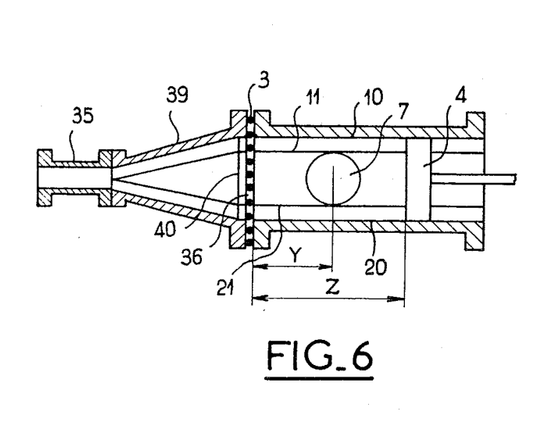
FIG. 6 illustrates a variable-coupling embodiment of this first arrangement.
Figure 6A:
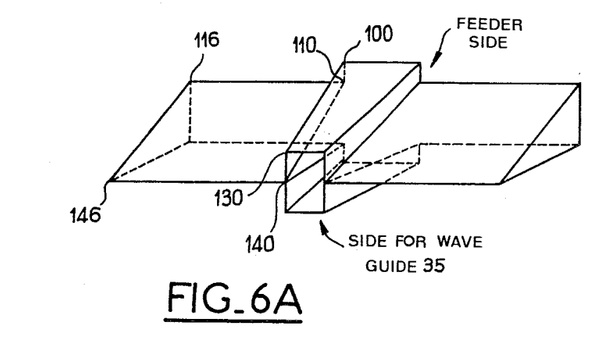
FIG. 6A is a perspective diagram showing the geometry of the transition in the first arrangement.

The effective shape of the transition 39 is diagrammatically defined by FIG. 6A. Each apex 100 of the internal rectangle formed by the feeder channels is connected to a corresponding apex 130 of the internal rectangle of wave guide 35, resulting in a frusto-pyramidal transition between the channels and the wave guide. The corners 110 of the channels of the feeder are connected to the central points 140 of the major sides of wave guide 35. Those central points 140 are also the starting points of the two side edges of the transition parallel to the Oy direction (FIG. 1) and extending on either side of the guide 35 to two end points 146 separated by the distance 2L. Finally, the corners 116 of the feeder projections are connected to the end points 146 of the edges. This transition is similar to the transitions between a rectangular wave guide and a channel wave guide described in the article by J. M. RUDDY, "Experimental results in grooved guides", I.E.E.E. transactions, Microwave Theory Tech. vol. MMT 13, pp. 880–881 (1965).

Figure 5C:
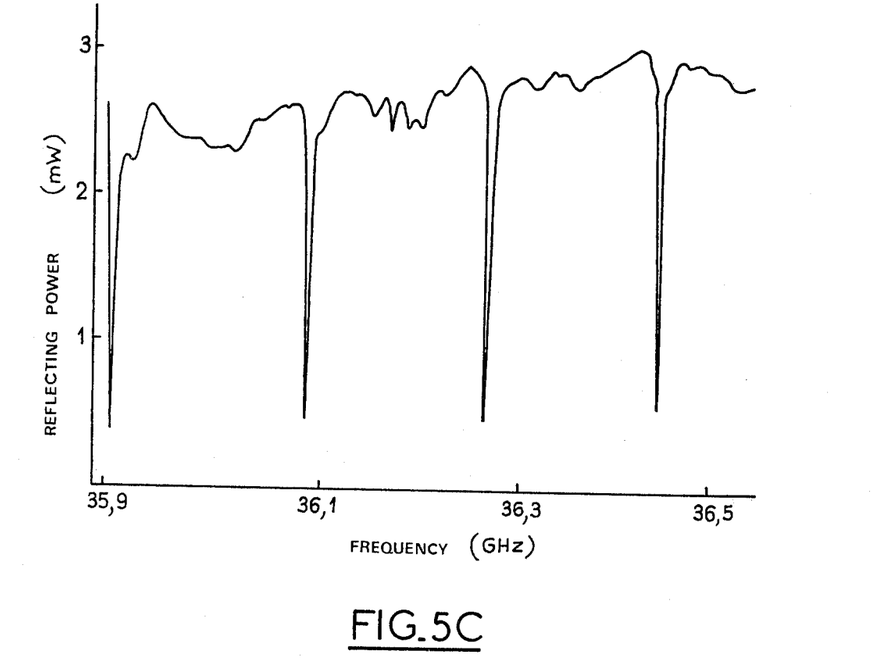
FIG. 5C is a graph illustrating the quality of the coupling of the feeder to a wave guide with that arrangement.

FIG. 5c shows graphically the power reflected in dependence on frequency. Only the fundamental modes appear. The resulting coupling is therefore very selective and suitable for high coupling factors. The construction of the feeder was as follows: b=17 mm; c=11 mm; l=4 mm; L=30 mm; Z=600 mm; 50 holes 2.5 mm in diameter distributed over the wall; RG 96 U type wave guide (7.1×3.55 mm).

Experiments have shown that the exact shape of orifices 36 has only a slight effect, provided there is substantially no change in the area of each orifice.

FIG. 6 shows a system similar to that in FIGS. 5A and 5B, except that in FIG. 6 the transition portion 39 near wall 3 comprises a region having the same cross-section as the feeder and is connected thereto slightly in front of wall 3. This leaves room for providing an auxiliary plate 40 which partially reflects microwaves. The plate can be made of unperforated Teflon or of a conductive material, perforated in similar manner to plate 3, for example. Plate 40 has an outer shape corresponding to the feeder cross-section and can be moved so as to vary its distance from wall 3. It is thus easy to vary the coupling between the feeder and the wave guide 35.

In the cases of a feeder having the previously-mentioned dimensions, the Q factor in vacuo (without a sample) is approx. 10 000. The coupling factor can be varied from 0.6 to 1, by moving a teflon plate 1.7 mm thick between two positions at 2.5 mm and 5 mm from plate 3.

Although the auxiliary plate can be placed on the feeder side, it is preferable to place it on the transition side as previously described.

Consequently, in the embodiment in FIGS. 5 and 6 the coupling is excellent, even in the case of a high coupling factor—i.e. there is a high selectivity and the diffraction losses are low.

It is also considered that the fact that the applicator is closed at the projections by walls 5 and 6 parallel to the xOz plane contributes to reduce the electric and magnetic transverse interfering mode, which is capable of radiating laterally. Accordingly, as previously stated, the side walls 5 and 6 can be removed, at least in part, when desirable, more particularly for admitting the sample to be treated. Similarly, in the variant shown in FIG. 6 comprising an auxiliary plate 40, an aperture is formed in at least one of the projections of transition 39 to admit the means for positioning plate 40.

Figure 7A:
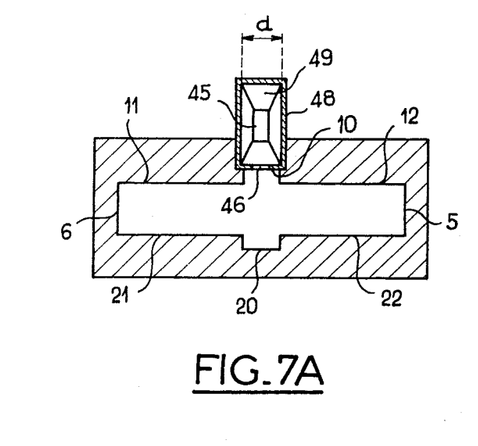
FIGS. 7A and 7B are two views in section of a second arrangement for coupling a feeder to a wave guide.
Figure 7B:
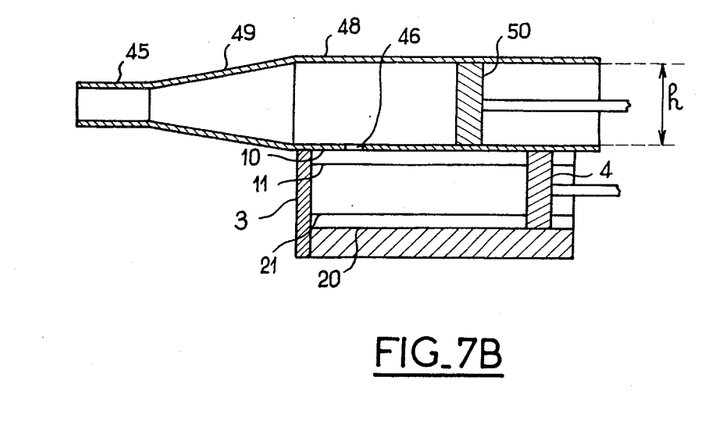

A second preferred method of coupling is illustrated in FIGS. 7A and 7B.

A supply wave guide 45 is introduced parallel to the central part 10 of the upper main wall of the feeder, from above the wall. The central part 10 is formed with a large orifice 46 (or, if required, a number of small orifices). A rectangular coupling wave guide 48 is disposed immediately above part 10 and is of larger dimensions than the supply wave guide 45. The orifice 46 terminates in a minor side of the oversize wave guide 48. A gradual pyramidal transition 49 is provided between wave guide 45 and wave guide 48. Transitions between two rectangular wave guides such as the wave guides 45 and 48 are conventional and can be produced in the manner described in paragraph III-A of the article by John P. QUINE entitled "Oversize Tubular Metallic Waveguides", forming section 2 of Chapter 3 of "Microwave Power Engineering" Volume I, edited by Ernest C. Okress, Electrical Science Series, Academic Press, New York and London, 1968. The height h and width d of the coupling wave guide 48 are made substantially equal to the feeder dimensions b and 21 respectively.

Orifice 46 is formed substantially a quarter-wavelength from the stationary wall 3 of the feeder (the wave length in this case is the wave length in the feeder during operation). The free end of the coupling wave guide 48 is closed by a movable piston 50 for adjusting the coupling factor between the incident wave guide 45 and the feeder.

The coupling in FIGS. 7A and 7B has likewise given good results, even with a single, large coupling orifice.

Of course, other forms of coupling can be designed. For example, the coupling system on a minor side of a coupling wave guide larger than the supply wave guide (FIGS. 7A and 7B) can be used on a feeder end wall having an orifice 36 as in FIG. 1 or a number of small orifices. In that case, the coupling can be varied by means of piston 4.

Conversely, the coupling can be varied by means of an auxiliary plate instead of piston 4 in the structure in FIGS. 7A and 7B.

What is claimed is:

1. A microwave applicator comprising two main conductive walls extending parallel to a common axial direction and each having two lateral projections and a central part joining the two projections, the projections of the two walls facing one another in pairs whereas the central parts of the two walls likewise face one another and are transversely protruding away from each other to define a central expansion therebetween; a first conductive end wall forming a short-circuit and extending in a plane forming a cross-section of the main walls; a second conductive end wall forming a second short-circuit extending in a plane forming a cross-section of the main walls, sample holding means adapted to support a sample transversely within the applicator, and a coupling means for supplying microwave energy to the applicator, the dimensions of the cavity formed by the main and end walls being arranged so that the cavity resonates substantially in the $TE_{11}$ mode, where the electric field is oriented along the cross-section of the main walls.

2. A microwave applicator according to claim 1, wherein the dimensions of the said central expansion between the main walls are chosen, with respect to the distance between the facing projections of the main walls, to give preference only to the $TE_{11}$ and $TM_{11}$ modes, and the distance between the conductive end walls is made substantially equal to an integral multiple of the half wavelength associated with the $TE_{11}$ mode, so that the applicator resonates only at the $TE_{11}$ mode.

3. A microwave applicator according to claim 1 wherein the central parts of the main walls are similar channels and the cross-sections of the projections are straight lines in parallel pairs.

4. A microwave applicator according to claim 3, wherein the channels are identical and U-shaped, and the dimensions of the channels substantially satisfy the following conditions:

$$b/3 \leq c < b$$

$$\frac{1}{c^2} - \frac{1}{b^2} \leq \frac{1}{4L^2}$$

2L denoting the common length of the channels, b denoting the maximum distance between the main walls taken at the bottom of the channels and c denoting the distance between the respectively facing projections from the main walls.

5. A microwave applicator according to claim 1, wherein the two main walls are symmetrical with respect to an axial plane, called the mode plane, parallel to their axial direction, and to the general direction of their major transverse dimension.

6. A microwave applicator according to claim 5, wherein each of the two main walls is symmetrical with respect to a second axial plane perpendicular to the mode plane and parallel to their axial direction.

7. A microwave applicator according to claim 5, wherein the distance between the respectively facing projections of the main walls are different on the two sides of the central parts resulting in an asymmetrical distribution of the electric field across the cross-section.

8. A microwave applicator according to claim 1, wherein the second conductive end wall is mounted for movement in the axial direction of the main walls, so that the applicator can be tuned to a fixed frequency in dependence on the microwave processing conditions.

9. A microwave applicator according to claim 1, which includes two side walls extending in the axial direction and joining the free ends of the main walls between the two end walls, and wherein an orifice is provided in at least one of the lateral walls for the admittance of a sample.

10. A microwave applicator according to claim 9, wherein the two lateral walls each have similar orifices through which a sample can pass.

11. A microwave feeder applicator according to claim 9, wherein the two side walls extend perpendicular to the general direction of the major transverse dimension of the main walls.

12. A microwave applicator according to claim 1, wherein the sample holding means is adapted to support the sample between the two main walls and substantially equidistant therefrom, extending in a direction substantially perpendicular to the axial direction of the two main walls.

13. A microwave applicator according to claim 12, wherein the sample holding means is adapted for a sample which is substantially cylindrical and has either a circular base or a substantially regular polygonal base.

14. A microwave applicator according to claim 1, comprising a central wall extending along the axial direction of the main walls and perpendicular to the general direction of their major transverse dimensions, whereby the sample is held in the region of an intense electric field in operation of the applicator.

15. A microwave applicator according to claim 1, wherein at least one of the two end walls includes a groove parallel to the general direction of the major transverse dimension in cross-section of the main walls, thus preventing currents perpendicular to the main walls from flowing in the end walls and producing interfering modes.

16. A microwave applicator according to claim 1, wherein the microwave supply coupling means comprises at least one orifice formed in one wall of the applicator, and a supply wave guide is coupled to the orifice.

17. A microwave applicator according to claim 16, wherein the orifice is formed in one end wall.

18. A microwave applicator according to claim 16, wherein the orifice is formed at the center of the central part of one of the main walls.

19. A microwave applicator according to claim 16, including a coupling transition provided to ensure a progressive transition from the mode in the supply wave guide to the desired electromagnetic distribution in the applicator near the orifice.

20. A microwave applicator according to claim 16, wherein the orifice is formed on a side wall of the wave guide supplying microwave energy to the applicator.

21. A microwave applicator according to claim 20, wherein the end of the supplying wave guide is disposed shortly after the coupling, and a movable piston is provided in that end forming a short-circuit, the piston being movable so as to vary the microwave power transmitted to the applicator.

22. A microwave applicator according to claim 16, wherein the coupling comprises a set of small area orifices distributed in regular manner, at least statistically, over a portion of one of the applicator walls.

23. A microwave applicator according to claim 22, wherein the small area orifices are formed in one end wall of the applicator and the coupling transition ensures a progressive transition from the cross-section of the supplying wave guide to the cross-section of the applicator.

24. A microwave applicator according to claim 22, wherein the coupling comprises an auxiliary plate which is arranged to partly reflect microwaves and is disposed near the set of small area orifices.

25. A microwave applicator according to claim 24, wherein the auxiliary plate is made of Teflon.

26. A microwave applicator according to claim 24, wherein the auxiliary plate is conductive and is also formed with small area orifices.

27. A microwave applicator according to claim 16, wherein the coupling orifice is designed for inductive coupling.

* * * * *